United States Patent
Sato

(10) Patent No.: US 6,188,679 B1
(45) Date of Patent: Feb. 13, 2001

(54) CDMA CHIP SYNCHRONIZATION CIRCUIT

(75) Inventor: Toshifumi Sato, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/988,990

(22) Filed: Dec. 11, 1997

(30) Foreign Application Priority Data

Dec. 13, 1996 (JP) .................................................. 8-333393

(51) Int. Cl.$^7$ .................................................. H04B 7/216

(52) U.S. Cl. ........................................... 370/335; 375/142

(58) Field of Search .................................... 370/203, 209, 370/320, 328, 335, 342, 350, 441, 479, 503, 512, 515, 516, 517, 519; 375/130, 138, 140, 141, 142, 144, 145, 147, 148, 149, 150, 267, 347; 455/132, 133, 134, 135, 63, 65, 67.3

(56) References Cited

U.S. PATENT DOCUMENTS

| | | | |
|---|---|---|---|
| 5,109,390 | * | 4/1992 | Gilhousen et al. .................. 370/335 |
| 5,508,708 | * | 4/1996 | Ghosh et al. ......................... 342/457 |
| 5,710,768 | * | 1/1998 | Ziv et al. .............................. 370/342 |
| 5,764,687 | * | 6/1998 | Easton .................................. 375/206 |
| 5,956,367 | * | 9/1999 | Koo et al. ............................. 375/206 |
| 5,963,582 | * | 10/1999 | Stansell, Jr. .......................... 375/200 |

FOREIGN PATENT DOCUMENTS

| | | |
|---|---|---|
| 57-141154 | 9/1982 | (JP) . |
| 2-39139 | 9/1990 | (JP) . |
| 4-347944 | 12/1992 | (JP) . |
| 6-284111 | 10/1994 | (JP) . |
| 10-32523 | 2/1998 | (JP) . |
| 10-173630 | 6/1998 | (JP) . |

OTHER PUBLICATIONS

"TIA/EIA Interim Standard (TIA/EIA/IS–95–A), Mobile Station–Base Station Compatibility Standard for Dual–Mode Wideband Spread Spectrum Cellular System PN–3421", May 1994, Chapters 6 and 7.

Dr. Andrew J. Viterbi, "Synchronization of Pseudorandom Signals", Principle of Spread Spectrum Communication, published Apr. 1995, Chapter 3, pp. 39–66.

* cited by examiner

Primary Examiner—Chi H. Pham
Assistant Examiner—Kwang B. Yao
(74) Attorney, Agent, or Firm—Ostrolenk, Faber, Gerb & Soffen, LLP

(57) ABSTRACT

A CDMA chip synchronization circuit is provided for a mobile communications system employing a wide band CDMA method, for example, a direct spread code division multiple access (DS-CDMA) method. The circuit is designed to perform detection of multipath receiving timing, particularly synchronous tracking, under a low Eb/No environment where multipaths are received in an overlapping manner. Herein, a radio receiver converts radio frequency signals to digital base band signals, and a search section detects a receiving timing with respect to multipath components contained in the digital base band signals. The detected receiving timing is used as a center position for receiving on a time axis. The radio receiver is connected with multipath receivers, each of which contains a number of correlators which produce correlation values between the multipath components and dc-spreading codes which are delayed by different delay times respectively. Herein, the correlators correspond to prescribed intervals of time which deviate from the center position for receiving on the time axis. The correlator outputs are temporarily stored in a memory. The multipath receiver periodically selects a correlator output having a best receiving quality from among the correlator outputs for every prescribed interval of time corresponding to a pilot period. Synchronous detection is performed using the selected correlator output. Outputs of the multipath receivers are combined at a maximum ratio, so that receiving data is produced.

8 Claims, 2 Drawing Sheets

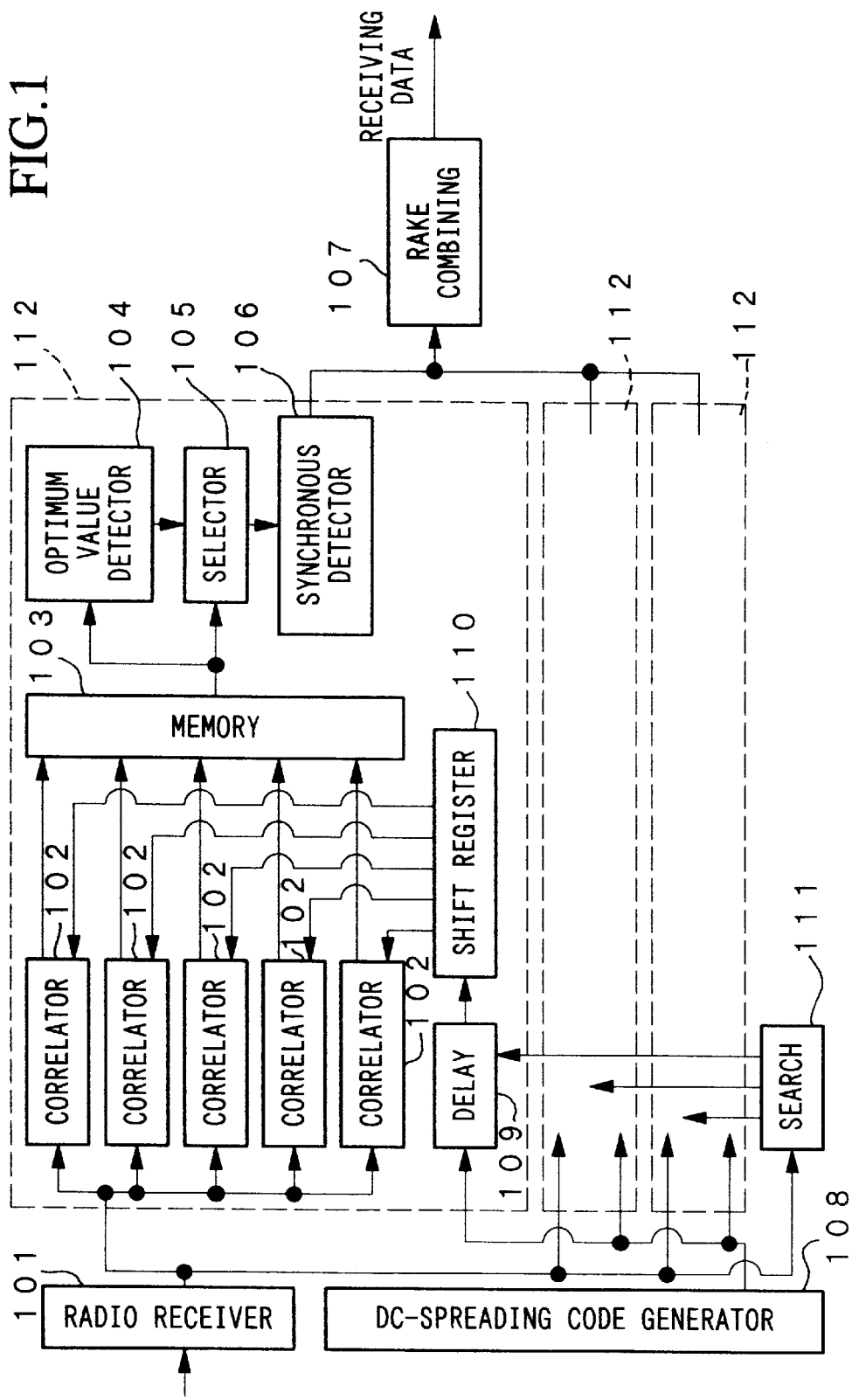

CDMA CHIP SYNCHRONIZATION CIRCUIT

BACKGROUND OF THE INVENTION

1. Field of the Invention

This invention relates to CDMA chip synchronization circuits which are provided in CDMA receivers to perform synchronous detection with respect to receiving timing of radio frequency signals. This application is based on patent application No. Hei 8-333393 filed in Japan, the content of which is incorporated herein by reference.

2. Prior Art

The CDMA chip synchronization circuit (where 'CDMA' stands for 'Code Division Multiple Access') is provided in the receiver of the mobile communications system, particularly in the receiver of the automobile phone and portable phone system (which will be simply called "cellular system") using the DS-CDMA method (where 'DS-CDMA' stands for 'Direct Spread CDMA'). In other words, the CDMA chip synchronization circuit is used to detect the receiving timing at the base station receiver.

Examples of the spread spectrum communications are disclosed by the papers of Japanese Patent Laid-Open Publication Nos. 4-347944 and 6-284111 both of which relate to the synchronization device for the spread spectrum communications equipment as well as Japanese Patent Publication No. 2-39139 which relates to the receiver of the spread spectrum communications method, for example. In addition, other information regarding the disclosure of the spread spectrum communications is disclosed in, for example, Chapter 6 and Chapter 7 of the paper entitled "TIA/EIA INTERIM STANDARD (TIA/EIA/IS-95-A) Mobile Station-Base Station Compatibility Standard for Dual-Mode Wideband Spread Spectrum Cellular System PN-3421 (to be published as IS-95-A)" which is published by the Telecommunication Industry Association (TIA) on May of 1994 as well as FIG. 3.1, FIG. 3.2, FIG. 3.6 and pages 39–66 of Chapter 3 of the paper entitled "Principles of Spread Spectrum Communication" which is written by Dr. Andrew J. Viterbi and published in May of 1995 by Addison-Wesley Publishing Company.

Among the conventional mobile communications systems, the so-called North American standard method (i.e., TIA IS95) is known as the digital cellular system using the CDMA method. In the standard specification of TIA/EIA/IS-95-A, Chapter 6 describes operations required for the mobile station, while Chapter 7 describes operations required for the base station. However, the above standard specification merely provides standardization for the radio interface. For this reason, the standard specification describes the modulation method and signal formats but fails to describe the concrete receiving method.

The forward link of IS-95-A (which is used to perform transmission from the base station to the mobile station) performs transmission of pilot channels (PLCH) in addition to transmission of traffic channels (TCH). Herein, the traffic channels are provided for multiple users subjected to modulation by information, whilst the pilot channels are not subjected to modulation by information. Further, the transmission of the pilot channels is performed using relatively intense electric power. Using the pilot channels, the mobile station is capable of determining the optimum receiving timing. So, the mobile station does not suffer as much from the problem that the receiving timing should be determined under low Eb/No (where 'Eb' denotes energy of receiving signals per 1 bit of information; and 'No' denotes electric power density of noise and interference signal per 1 Hz).

However, transmission of the pilot channels using the intense electric power results in reduction of a number of traffic channels which are used for actual transmission of information. This causes another problem that a number of users per one base station should be reduced.

On the other hand, no common pilot channels exist in the reverse link of IS-95-A (which is used to perform transmission from the mobile station to the base station). So, the reverse link employs the modulation method corresponding to the 64-ary orthogonal code modulation combined with the quadruple direct spread. Using the 64-ary orthogonal codes, as compared with the BPSK and QPSK (where 'BPSK' stands for 'Binary Phase-Shift Keying' and 'QPSK' stands for 'Quaternary PSK'), it is possible to provide a variety of advantages:

It is possible to increase electric power per one symbol and it is possible to reduce deterioration for synchronous detection even if asynchronous detection is employed.

However, the above has problems relating to receiving method.

Main elements of the IS-95-A are determined such that the chip rate is set at 1.2288 Mcps, the bit rate is at 9.6 kbps and the spread rate of the direct spread is at 128. According to the above, the chip rate is relatively low speed (because of the narrow-band CDMA), wherein as compared with instantaneous variations of the propagation delay, the chip period is relatively long. For this reason, the amount of deterioration in receiving characteristics is small even if characteristics of the receiving timing detecting circuit are somewhat loose. However, to perform high-speed data communications with respect to voices and other information, it is necessary to increase the bit rate and chip rate by a certain factor of multiplication which ranges between 5 and 10; in other words, it is necessary to provide the wide band CDMA. In that case, other problems occur which the IS-95-A cannot expect. In the case of the chip rate of 10 Mpcs, for example, if the propagation path differs by 30 m, the receiving timing deviates from the original timing with respect to one chip only. So, it is not possible to receive signals with the original timing. In addition, a plurality of multipaths overlap with each other within a range of delay times corresponding to multiple chips. In that case, there is a problem that positions of peaks cannot be clearly defined.

A conventional example of the receiving timing detection method (or chip synchronization method) is taught by the paper entitled "Principles of Spread Spectrum Communication" which is written by Dr. Andrew J.

Viterbi and published May 1995 by Addison-Wesley Publishing Company. The operation to capture the timing of signals which are spread by spread codes corresponding to pseudo-random codes is performed in two stages of processing. That is, the method performs initial synchronous capture (or initial synchronous search) and synchronous tracking.

The method of the initial synchronous search is explained in the fourth paragraph of Chapter 3 of the above paper. According to this method, until the correlation electric power exceeds a certain threshold value, the search is performed in a serial manner with shifting the receiving timing by a half chip space.

The synchronous tracking corresponds to the method of so-called "early-late gate" or "delay lock loop (DLL)". This method calculates first correlation electric power corresponding to the early timing which is earlier than the reference timing by the delay time Δt for the receiving and second correlation electric power corresponding to the late timing which is later by Δt. Then, the method performs fine timing adjustment in such a way that a difference between the first electric power and second electric power becomes zero.

Meanwhile, Japanese Patent Laid-Open Publication No. 4-347944 discloses some improvements to the method of the initial synchronous search and synchronous tracking. Particularly, the paper discloses the method regarding the commonality of circuits as well as the method to add tracking function to the multipath propagation path. However, the basic operation of the above method is identical to that of the aforementioned paper written by Dr. Andrew J. Viterbi. In addition, this method is not capable of solving the aforementioned problems in the wide band CDMA.

Japanese Patent Publication No. 2-39139 describes a method to search a new path wherein operation of the sliding correlator is not made only in the initial synchronous search but is made normally. Similar description is found in Patent Laid-Open Publication No. 6-284111. According to the above method which is designed to perform searching of new paths normally, it is possible to shorten the instantaneous break time in communications. However, it cannot be said that the method is capable of detecting peak positions accurately with a short time.

In short, the mobile communications system using the CDMA method performs receiving of so-called multipath signals, wherein the system should perform matching of timing with respect to each of signals. Herein, the multipath signals are transmitted to the system via multiple propagation paths which differ from each other in propagation time due to the reflection by buildings and mountains, for example. To achieve effective usage of frequencies in communications, each channel should have a capability of receiving signals under the very low Eb/No environment.

Particularly, in case of the wide band CDMA method whose chip rate is 10 Mcps or so, the receiving timing is shifted by one chip when the propagation distance changes by 30 m. Such a shift makes the receiving operation impossible. A difference of propagation delay corresponding to a difference of propagation distance of 30 m or so easily occurs when a small variation occurs in the propagation path even if the distance between the base station and mobile station is unchanged. In other words, there frequently occurs a phenomenon that the receiving is performed with respect to the multipaths which overlap with each other in a range of multiple chips, and variations simultaneously occur with respect to receiving paths (i.e., emergence and vanishing of new paths).

Conventionally, the DLL technology is used for the synchronous tracking of the receiving timing. This technology is effective under prescribed conditions that each multipath has a separate peak and the propagation delay time continuously and gradually changes. In contrast, the wide band CDMA works under the condition where the receiving is performed with respect to the mutipaths in an overlap manner and the delay time discontinuously changes. So, the wide band CDMA suffers from a problem due to its inability to perform of the tracking.

SUMMARY OF THE INVENTION

It is an object of the invention to provide a CDMA chip synchronization circuit for the mobile communications system employing the wide band CDMA method so that adjustment of multiple receiving timing, particularly synchronous tracking, can be performed under a low Eb/No environment.

As a result of this invention, it is possible to improve receiving quality of a wide band CDMA receiver; and it is possible to perform high-speed data transmission.

A CDMA chip synchronization circuit of this invention is provided for a mobile communications system employing a wide band CDMA method, especially direct spread code division multiple access (DS-CDMA) method.

In the CDMA chip synchronization circuit, a radio receiver converts radio frequency signals to digital base band signals, whilst a search section detects receiving timing with respect to multipath components contained in the digital base band signals. The detected receiving timing is used as a center position for receiving on a time axis. The radio receiver is connected with multipath receivers, each of which contains a number of correlators which produce correlation values between the multipath components and dc-spreading codes which are delayed by different delay times respectively. Herein, the correlators correspond to prescribed intervals of time which deviate from the center position for the receiving on the time axis. Correlator outputs are temporarily stored in a memory. Then, the multipath receiver selects a correlator output having a best receiving quality from among the correlator outputs by every prescribed interval of time corresponding to a pilot period, so synchronous detection is performed using the selected correlator output. Outputs of the multipath receivers are combined at a maximum ratio, so that receiving data are produced.

Thus, the CDMA chip synchronization circuit of this invention has a capability to certainly perform detection of multipath receiving timing, particularly synchronous tracking, under a low Eb/No environment where multipaths are received in an overlap manner.

BRIEF DESCRIPTION OF THE DRAWINGS

These and other objects of the subject invention will become more fully apparent as the following description is read in light of the attached drawings wherein:

FIG. 1 is a block diagram showing a CDMA chip synchronization circuit in accordance with an embodiment of the invention;

DESCRIPTION OF THE PREFERRED EMBODIMENT

Figure 2A:
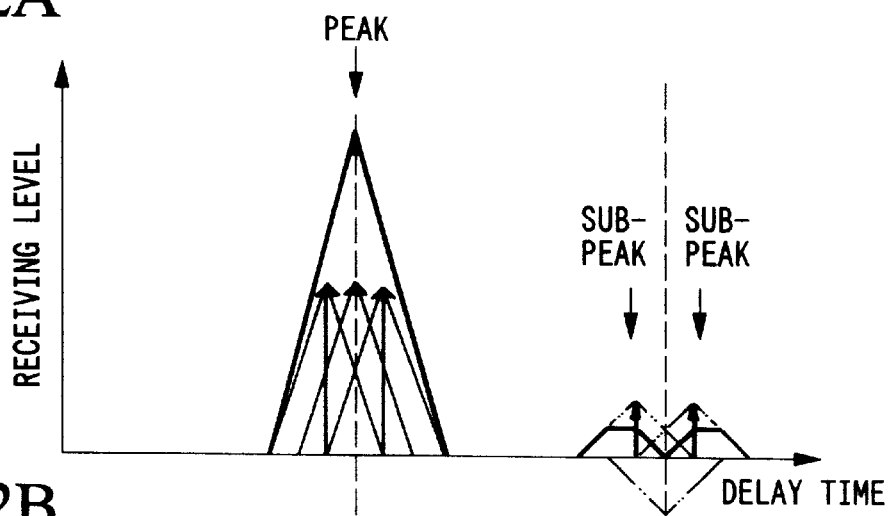
FIGS. 2A and 2B are graphs showing relationships between delay time and receiving level with respect to models of propagation characteristics of the wide band CDMA method which the invention employs.

Now, a preferred embodiment of the invention will be described with reference to FIG. 1 to FIG. 3.

FIG. 1 is a block diagram showing a CDMA chip synchronization circuit in accordance with an embodiment of the invention. In FIG. 1, a radio receiver 101 receives radio frequency signals and converts them to digital base band signals. A plurality of multipath receivers, each designated by a same numeral of "112", are provided to perform decoding processes with respect to multipath components contained in the digital base band signals. Herein, each multipath receiver 112 performs a decoding process with respect to each multipath component. Then, the decoded multipath components are supplied to a RAKE combining section 107 wherein they are combined at a maximum ratio. So, the RAKE combining section 107 produces receiving data. A dc-spreading code generator 108 generates dc-spreading codes which reversely spread spectrum. A search section 111 measures the receiving timing with respect to the multipath components.

Each, the multipath receiver 112 is configured as follows:

A delay section 109 delays the dc-spreading codes to coincide with the receiving timing which the search section 111 detects. A shift register 110 further delays the delayed dc-spreading codes, output from the delay section 109, by different delay times. Herein, the shift register section 110 has multiple output terminals corresponding to different delay times which differ from each other by a constant delay which corresponds to ¼ chip, for example. A plurality of correlators, each designated by the same numeral of "102", produces correlation values between the digital base band signals and outputs of the shift register 110. Thus, the correlators 102 as a whole perform operation of "dc-spreading" with respect to receiving signals. A memory 103 temporarily stores (or accumulates) outputs of the correlators 102. An optimum value detector 104 and a selector 105 cooperate to intermittently perform reading operations on the memory 103 by certain intervals of time, thus selecting a correlator output which has a best receiving quality. Using the selected correlator output, a synchronous detector 106 performs synchronous detection.

Under a real propagation environment, a number of the multipath receivers 112 is determined based on a trade-off relationship established between a maximum number in effective numbers of the multipaths and the hardware scale. Normally, in the case of a city environment, it is sufficient to provide four multipath receivers per one radio signal receiver (which corresponds to one antenna). One multipath receiver 112 contains five correlators 102 which produce correlation values with respect to five timings. Herein, the timing designated by the search section 111 is used as the center of the five timings. So, there are provided five timings which are represented by 0 (i.e., center), ±¼ chip and ±½ chip respectively.

In the above case, the memory 103 should have a capability to store five correlator outputs. Namely, the memory 103 stores one slot, which is partitioned by a pilot symbol, with respect to each correlator output.

The mobile station performs transmission of reverse signals which are placed in frame synchronization with forward signals which are transmitted from the base station to the mobile station. So, the search section 111 of the base station has a capability to perform path search within a prescribed range of propagation delays in accordance with a radius of a service area which covers one base station. The method of the path search for the base station is shown in Japanese Unexamined Patent Publication No. Hei 10-32523 published Feb. 3, 1998.

Next, processing of the optimum value detector 104 will be explained in conjunction with FIGS. 2A and 2B.

Figure 2B:
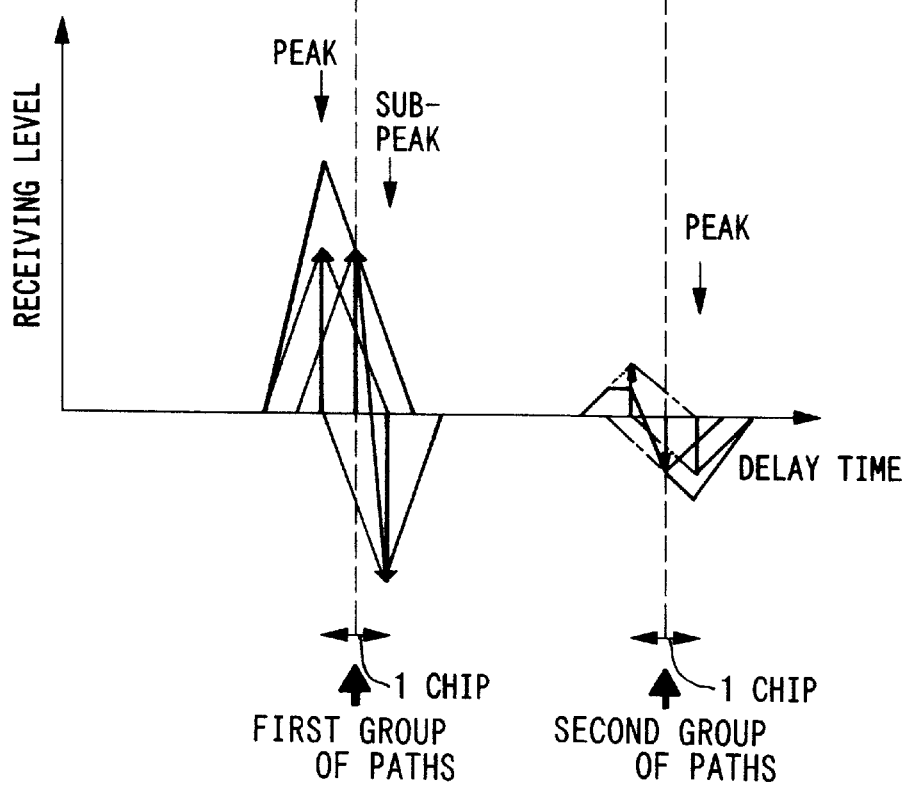

FIGS. 2A and 2B are graphs showing relationships between delay time and receiving level with respect to models of propagation characteristics (i.e., delay profiles) of the wide band CDMA method which the invention employs.

The above graphs are made in connection with two independent groups of multipaths, each group of which contains three paths which overlap with each other and which deviate from each other by ½ chip.

In the case of the graph of FIG. 2A, a first group of three paths are all received with a same phase. Thus, the three paths are enhanced in receiving level so that a peak emerges at the center of the three paths on a time axis. As for a second group of three paths, a center path is received with a phase which is inverse to phases of other paths. Therefore, the three paths are canceled with each other in receiving level, so that the receiving level of the center path should become very small. For this reason, two sub-peaks emerge in the receiving level regarding the second group of paths.

In the case of the graph of FIG. 2B, as for a the first group of three paths, only a last path is received with an inverse phase, so that a position of a peak is shifted in a backward direction from a center position by ½ chip on a time axis. In addition, a small sub-peak emerges at a position which is ½ chip after the center position. As for a second group of three paths, two paths other than a first path are received with inverse phases, so a position of a peak delays from a center position by ½ chip.

As described above, in the case where the system (e.g., station) receives multiple multipaths in an overlap manner with small shifts of phases, even if the paths do not change in receiving timing and receiving level, a peak in an overall receiving level fluctuates in position and level.

The receiver applicable to this invention is designed as follows:

A search section detects positions with respect to groups of paths, to which multipath receivers are assigned respectively. Herein, each multipath receiver uses the timing that the search section detects as a center position for receiving on a time axis. So, the multipath receiver has multiple correlators which perform dc-spreading on receiving signals with respect to both forward and backward directions from the center position on the time axis. That is, the correlators are provided to cope with delays of the timing which correspond to ±½ chip and ±¼ chip from the center position. Then, the multipath receiver selects a correlator output having a best receiving quality from among correlator outputs which are provided with certain intervals of time. So, the multipath receiver performs decoding of the selected correlator output.

In case of the second group of paths shown in FIG. 2A, the sub-peaks emerge at different timings which separate from each other by 1 chip or more, it can be presumed that noise contained in one sub-peak is independent from noise contained in another sub-peak. In case of the first group of paths shown in FIG. 2B, a relatively large sub-peak emerges at the timing apart from the peak by 1 chip or more.

The present embodiment can be modified to cope with the above cases. That is, the present embodiment can be modified in such a way that two correlator outputs corresponding to two peaks (or sub-peaks) are extracted and combined.

Figure 3:
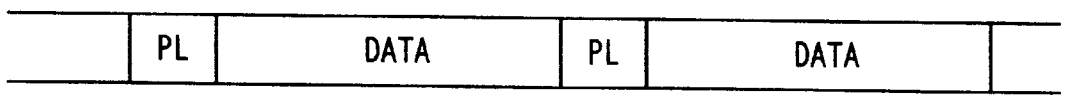
FIG. 3 shows an example of a signal format.

FIG. 3 shows an example of a signal format applicable to this invention. Herein, 'PL' designates a pilot symbol.

As shown in FIG. 3, a "known" pilot signal is periodically inserted into transmission of data by a constant period (i.e., pilot period which is set at 0.625 ms, for example) which is shorter than a fading period. In that case, the above pilot signal can be used as a reference signal for synchronous detection, details of which will be described below.

The pilot period is used as a partition of transmission. So, multiple correlator outputs are stored in the memory. The system measures receiving quality of signals contained in the pilot period with respect to each of the correlators. Then, the system selects a correlator output having a highest receiving quality. Or, if a sub-peak is detected at a position which sufficiently is separated from the timing (i.e., peak position) of the correlator having the highest receiving quality and which is considered to be independent from noise, the system extracts a correlator output corresponding to the sub-peak from the memory. Thus, the synchronous detection is performed by using the pilot signal as the reference signal representing carrier phase.

Incidentally, it is possible to employ a variety of methods for determination of the receiving quality for each of the correlator outputs, as follows:

(1) Determination is made based on the receiving level of the pilot signal.

(2) If the pilot signal is constructed by multiple symbols, determination is made based on a ratio between a square of an average value (i.e., presumed value of signal power) and a variance (i.e., presumed value of noise power).

(3) Determination is made by measuring receiving levels with respect to the pilot signal portion as well as the data portion.

(4) Temporary decision is made with respect to the data portion. Reverse modulation is effected on the receiving data on the basis of the result of the temporary decision, so phases of all data are made uniform with the carrier phase. Then, a determination is made based on a ratio between a square of an average value (i.e., presumed value of signal power) and a variance (i.e., presumed value of noise power).

Finally, this invention is capable of demonstrating a variety of effects, which the conventional technology cannot provide, as follows:

(1) It is possible to perform fine adjustment for the optimum receiving timing by a certain period, e.g., a pilot period for insertion of a pilot signal into transmission of data. So, even in the wide band CDMA under a propagation environment where the receiver performs receiving with respect to multipaths which overlap with each other, it is possible to perform synchronous tracking to follow variations of peaks in receiving level. Namely, it is possible to perform receiving in a stable manner.

(2) It is possible to loosen a detection precision of the search section. For this reason, it is possible to reduce a time for averaging at a search mode. Therefore, it is possible to perform fast detection of a new path even if a propagation path rapidly changes.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A CDMA chip synchronization circuit, which is provided for a receiver of a mobile communications system employing a code division multiple access (CDMA) method, said circuit adapted to receive an input signal, said circuit comprising:
    a search unit which detects a receiving timing based on a plurality of multipath components contained in said input signal;
    a plurality of receivers, a first receiver spreading said input signal based upon said receiving timing, each other receiver spreading said input signal based on a respective alternate receiving timing, each of said respective alternative receiving timings being a deviation from said receiving timing by prescribed intervals of time shorter than a 1-chip period, said receivers each producing a respective output as a result of said spreading;
    a memory which stores said outputs of said correlators; and
    a selector which periodically selects one of said outputs of said receivers that has a best receiving quality.

2. A CDMA chip synchronization circuit as defined in claim 1, wherein said selector periodically selects said one of said outputs based upon a period which is shorter than a fading period of a propagation path of said input signal, and which allows for an averaging process to be preformed with respect to receiving qualities of said input signal.

3. A CDMA chip synchronization circuit as defined in claim 1, wherein if an interval of time between a first receiving timing having a best receiving quality and a second receiving timing having a second best receiving quality is shorter than a prescribed interval of time, said selector selects two outputs which correspond to two receivers that spread said input signal based on said first and second receiving timing respectively.

4. A CDMA chip synchronization circuit as defined in claim 1, wherein said best receiving quality is determined based on an amount of electric power of said input signal.

5. A CDMA chip synchronization circuit as defined in claim 1, wherein said best receiving quality is determined based on a ratio between electric power of said input signal and interference electric power.

6. A CDMA chip synchronization circuit, which is provided for a mobile communications system employing a code division multiple access (CDMA) method, said circuit adapted to receive an input signal, said circuit comprising:
    a radio receiver which converts said input signal to digital base band signals;
    a plurality of multipath receivers which perform decoding processes on respective multipath components contained in said digital base band signals thereby producing decoded multipath components;
    a RAKE combining section which combines said decoded multipath components, thereby producing receiving data;
    a dc-spreading code generator which generates dc-spreading codes used in performing dc-spreading of the spectrum of said digital base band signals;
    and a search unit which detects a receiving timing based on said multipath components contained in said digital base band signals;
    wherein each of said multipath receivers comprises:
        a delay circuit which delays said dc-spreading codes so that said dc-spreading codes coincide with said receiving timing detected by said search unit, said delay circuit thereby producing delayed codes;
        a shift register having a plurality of output terminals, said shift register receives said delayed codes, outputs said delayed codes to one of said output terminals with no significant further delay, and outputs said delayed codes to others of said output terminals at a plurality of further delayed time intervals, said further delayed time intervals each being constant and shorter than a 1-chip period;
        a plurality of correlators, each coupled to a respective output terminal, said correlators each perform said dc-spreading of said digital base band signals by producing respective correlation values between said digital base band signals and an output of a respective output terminal of said shift register, said correlators each producing a respective correlator output as a result of said dc-spreading;
        a memory which stores said outputs of said correlators;
        a selector which periodically reads said memory and selects a select output of said outputs of said correlators having a best receiving quality; and a synchronous detector which performs synchronous detection on said select output.

7. A CDMA chip synchronization circuit, which is provided for a mobile communications system employing a code division multiple access (CDMA) method, said circuit receiving an input signal, said circuit comprising:
- a radio receiver which converts said input signal to digital base band signals;
- a search unit which detects a receiving timing based on multipath components contained in said digital base band signals;
- a plurality of multipath receivers, each multipath receiver includes:
  - a plurality of correlators that produce correlation values between said multipath components and dc-spreading codes which are delayed from one another by intervals of time which are shorter than a 1-chip period, at least one of said dc-spreading codes being based on said receiving timing, said correlators each producing a respective correlator output;
  - a memory which stores said correlator outputs;
  - a selector which periodically selects a correlator output having a best receiving quality from among said correlator outputs thereby producing a selected correlator output; and
  - a synchronous detector which performs synchronous detection on said selected correlator output, thus providing an output of said multipath receiver; and
- a combiner which combines outputs of said multipath receivers thus producing receiving data.

8. A CDMA chip synchronization circuit as defined in claim 7, wherein said selector selects said selected correlator output based on a period which corresponds to a pilot period for inserting a pilot signal into said input signal, and wherein said pilot period is shorter than a fading period of a propagation path of said input signal.

* * * * *